United States Patent
Gryskiewicz et al.

(10) Patent No.: US 6,421,785 B1
(45) Date of Patent: Jul. 16, 2002

(54) CLOCK SELECTION FOR PROCESSING AUDIO DATA

(75) Inventors: Paul S. Gryskiewicz; Karl H. Mauritz, both of Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/185,247

(22) Filed: Nov. 3, 1998

(51) Int. Cl.[7] .............................................. G06F 1/08
(52) U.S. Cl. ...................................................... 713/500
(58) Field of Search ............................... 713/500–503, 713/600

(56) References Cited

U.S. PATENT DOCUMENTS

| | | | | |
|---|---|---|---|---|
| 4,430,722 A | * | 2/1984 | Massen et al. ............... | 708/425 |
| 4,550,292 A | * | 10/1985 | Smith ............................ | 331/2 |
| 4,852,124 A | * | 7/1989 | Raucci ......................... | 375/293 |
| 4,974,082 A | * | 11/1990 | Heitmann ................... | 348/537 |
| 5,218,363 A | * | 6/1993 | LeCroy, Jr. et al. ......... | 341/123 |

* cited by examiner

Primary Examiner—Thomas M. Heckler
(74) Attorney, Agent, or Firm—Trop, Pruner & Hu, P.C.

(57) ABSTRACT

A circuit to provide one clock signal from a plurality of possible clock signals includes a register to receive indication of a data sampling frequency, a selection circuit operatively coupled to the register, the indicated data sampling frequency selecting one of a plurality of signals provided to the selection circuit, and a modification circuit to modify the selected signal based at least in part on the indicated sampling frequency. A method to automatically and dynamically provide one clock signal from a plurality of possible clock signals includes receiving a signal indicating a data sampling frequency, selecting one clock signal from a plurality of input clock signals based on the received data sampling frequency indication, and modifying the selected clock signal, based on the indicated sampling frequency, to generate an output clock signal. The modified selected signal (for the circuit) and the modified selected clock signal (for the method) may be provided as a clock signal to, for example, an audio processing circuit.

27 Claims, 5 Drawing Sheets

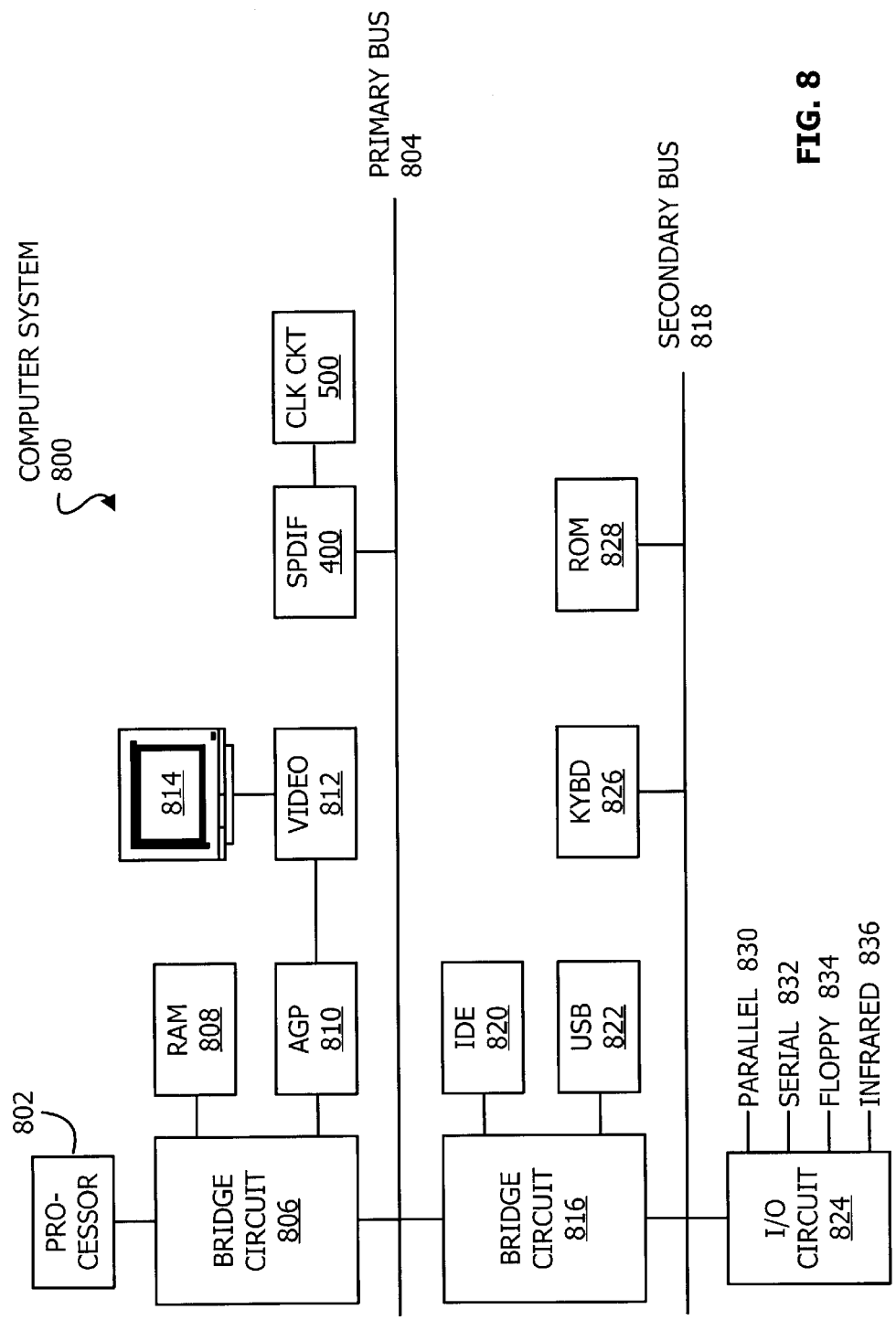

CLOCK SELECTION FOR PROCESSING AUDIO DATA

BACKGROUND

The invention relates generally to the field of audio data processing and, more particularly, to the automatic and dynamic selection of a clock frequency for processing audio data.

The International Electrotechnical Commission 958 (IEC-958) standard describes a serial, unidirectional, self-clocking interface (e.g., a data format and transport protocol) for the interconnection of digital audio equipment. A consumer version of the IEC-958 standard is commonly referred to as the Sony, Philips Digital Interface Format (SPDIF) interface. (International Electrotechnical Commission publication 60958-3 Ed. 1.0 entitled "Digital audio interface—Part 3: Consumer applications.")

The SPDIF protocol defines a serial data stream comprising sub-frames, frames, and blocks. As shown in FIG. 1, there are 2 sub-frames (e.g., 100 and 102) in a frame (e.g. 104) and 192 frames in a block (e.g., 106). Each sub-frame (e.g., sub-frame 100) comprises 32 time slots. Time slots 0 through 3 may be used to encode preamble 108 information. Time slots 4 through 27 may be used to represent digital data 110. (If less than 24 bits are used to represent the data, time slots 4 through 7 may be filled with zeros. If less than 20 bits are used to represent the data, the least significant bits (LSBs) may be filled with zeros.) Time slots 28 through 31 may be used to encode ancillary information 112. For example: time slot 28 may be used to encode a data sample validity flag; time slot 29 may be used to encode user information; time slot 30 may encode channel status information; and time slot 31 may encode a parity indication.

If the information being transmitted in accordance with the SPDIF protocol is stereo data, such as linear pulse code modulated (LPCM) data, each frame may be used to time multiplex audio channel data. As shown in FIG. 2., sub-frame 200 may be used to encode channel-1 data 202 (left channel data, for example), and sub-frame 204 may be used to encode channel-2 data 206 (right channel data for example). Each sub-frame also has its associated preamble (208 and 210) and ancillary (212 and 214) fields.

If the information being transmitted is multi-channel audio data, it may be divided into a discrete number of SPDIF frames and transmitted. For example, if the audio data is AC-3 data, it may be formatted as a sequence of 16 bit words and transmitted as a continuous burst of 8 SPDIF blocks (1536 SPDIF frames). (Advanced Television Systems Committee publication A/52 entitled "Digital Audio Compression (AC-3) Standard," December 1995.)

As shown in FIG. 3, each AC-3 burst 300 (referred to as an AC-3 sync frame) includes a 64 bit preamble 302 comprising a synchronization code, an indicator of the burst length, and information about the type of data contained in the burst. Audio data (AB0–AB5) 304, 306, 308, 310, 312, and 314 follows preamble 302. Tail field 316 follows audio data AB5 314 and may include error correction information. In general, AC-3 sync frame boundaries occur at a frequency of once every 1536 SPDIF/IEC-958 frames.

The SPDIF standard may be embodied in a SPDIF module as shown in FIG. 4. Module 400 may include controller 402, formatter 404, and output circuit 406. Controller 402 provides a mechanism through which an application program 408 may communicate with module 400 (e.g., to provide and/or receive audio data). Controller 402 also provides a mechanism through which module 400 interacts with memory 410. The memory mechanism is typically a direct memory access (DMA) interface to module 400's host computer system (not shown). Formatter 404 takes unformatted audio data and places it into SPDIF format as described above and illustrated in FIGS. 1 through 3. Output circuit 406 takes formatted SPDIF frames from formatter 404 and an appropriate input clock signal 412, and transmits a serial data stream to a target device. The IEC-958 standard currently allows for three clocking, or sampling frequencies: 48.0 KHz; 44.1 KHz; and 32.0 KHz. That is, the audio data transmitted in a SPDIF block may have an associated sampling frequency of 48.0 KHz, 44.1 KHz, or 32.0 KHz. Thus, input clock signal 412 is one of these clocking frequencies, or a multiple (typically 64 or 128 times) of one of these three clocking frequencies.

SUMMARY

In one embodiment, a circuit provides a register to receive indication of a data sampling frequency, a selection circuit operatively coupled to the register, the indicated data sampling frequency selecting one of a plurality of signals provided to the selection circuit, and a modification circuit to modify the selected signal based at least in part on the indicated sampling frequency. In another embodiment, the modified selected signal may be provided, as a clock signal, to an audio processing circuit.

In yet another embodiment, a method to generate a clock signal is provided. The method includes receiving a signal indicating a data sampling frequency, selecting one clock signal from a plurality of input clock signals based on the received data sampling frequency indication, and modifying the selected clock signal, based on the indicated sampling frequency, to generate an output clock signal. In still another embodiment, the output clock signal may be used, for example, as a clock signal for an audio processing circuit. The method may be stored in any media that is readable and executable by a programmable control device.

In yet another embodiment, a computer system comprises a bus, a host processor operatively coupled to the bus, an audio processing circuit operatively coupled to the bus, and a clock circuit operatively coupled to the audio processing circuit, the clock circuit having a register to receive indication of a data sampling frequency from the audio processing circuit, a selection circuit operatively coupled to the register, the indicated data sampling frequency selecting one of a plurality of signals provided to the selection circuit, and a modification circuit to modify the selected signal based on the indicated sampling frequency.

BRIEF DESCRIPTION OF THE DRAWINGS

FIG. 8 shows a computer system in accordance with one embodiment of the invention.

DETAILED DESCRIPTION

Techniques (including methods and devices) to automatically (without user intervention) and dynamically (based on data status information) provide one clock frequency from a plurality of possible clock frequencies to an audio processing circuit are described. An illustrative embodiment is described below in terms of the Sony, Philips Digital Interface Format (SPDIF) interface. The embodiment so described is illustrative only and is not to be considered limiting in any respect.

Modules designed to implement the SPDIF standard generally require a clock signal that is related to the encapsulated audio data's sampling frequency ($F_s$). Currently, the SPDIF standard allows $F_s$ to be 48.0 KHz, 44.1 KHz, or 32.0 KHz. The SPDIF standard also allows $F_s$ to vary from SPDIF block to SPDIF block.

Because the SPDIF interface is designed to transmit audio data in real time, a fully functional SPDIF module should be able to dynamically select the appropriate clock signal based on a characteristic of the audio data, for example, the audio data's $F_s$. Indication of the audio data's sampling frequency is periodically provided in accordance with the SPDIF specification—generally as channel status information in the SPDIF bit stream.

Figure 1:
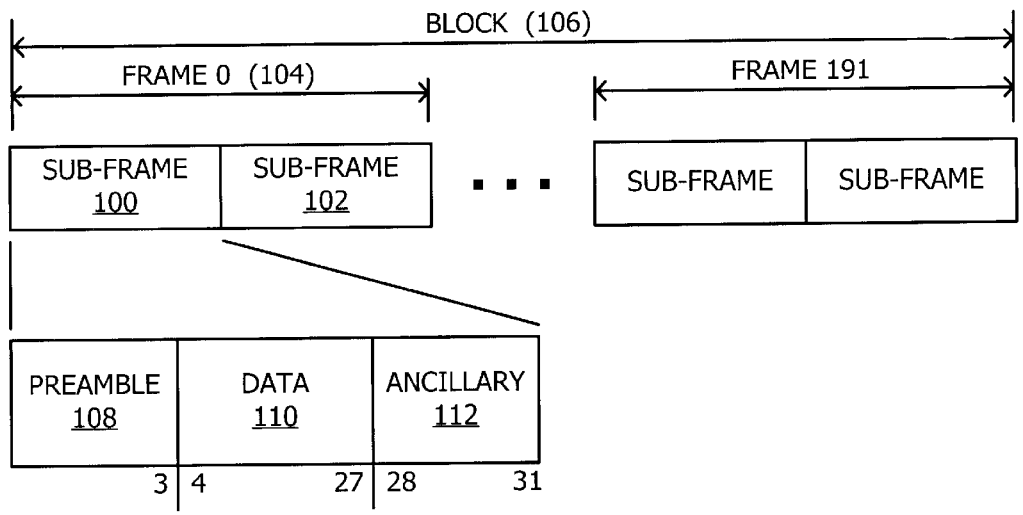
FIG. 1 illustrates the format of a Sony, Philips Digital Interface Format (SPDIF) data block.
Figure 2:
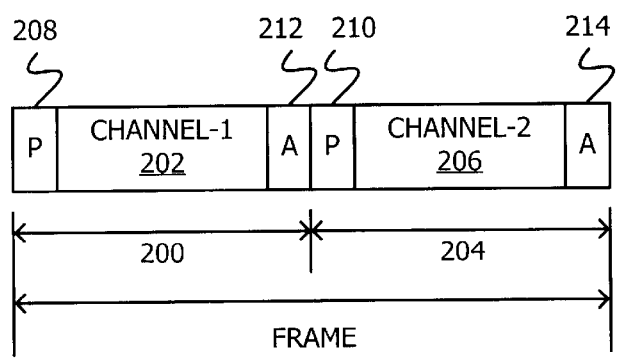
FIG. 2 shows how stereo audio data may be formatted in accordance with the SPDIF standard.
Figure 3:
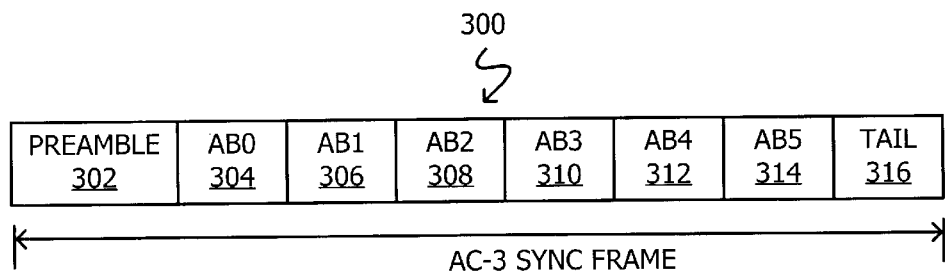
FIG. 3 illustrates the format of an digital audio compression (AC-3) synchronization frame.
Figure 4:
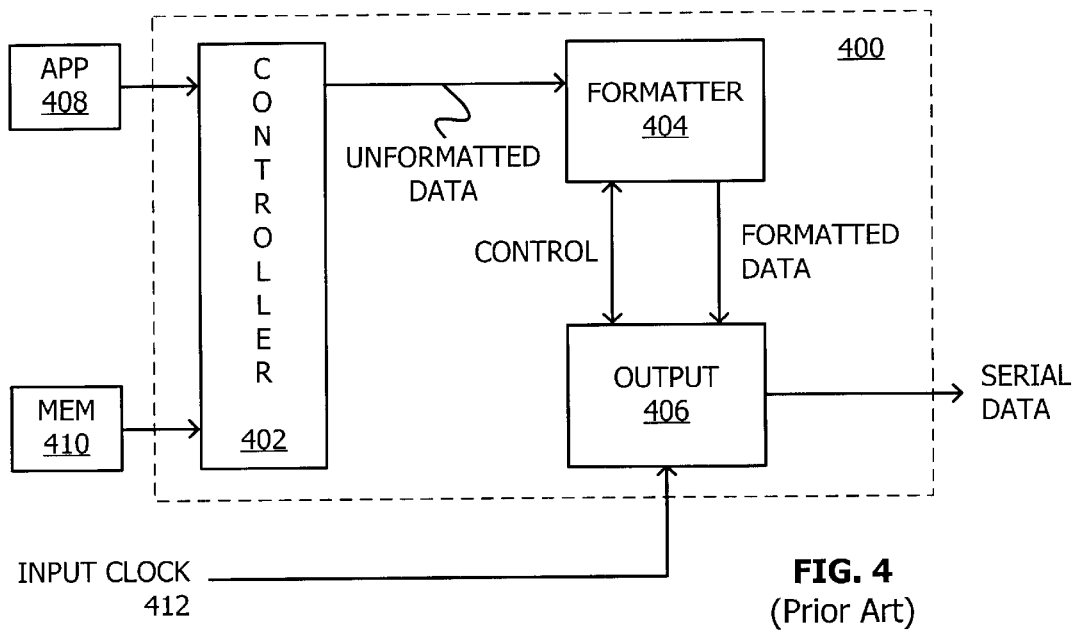
FIG. 4 is a block diagram of a conventional SPDIF module.
Figure 5:
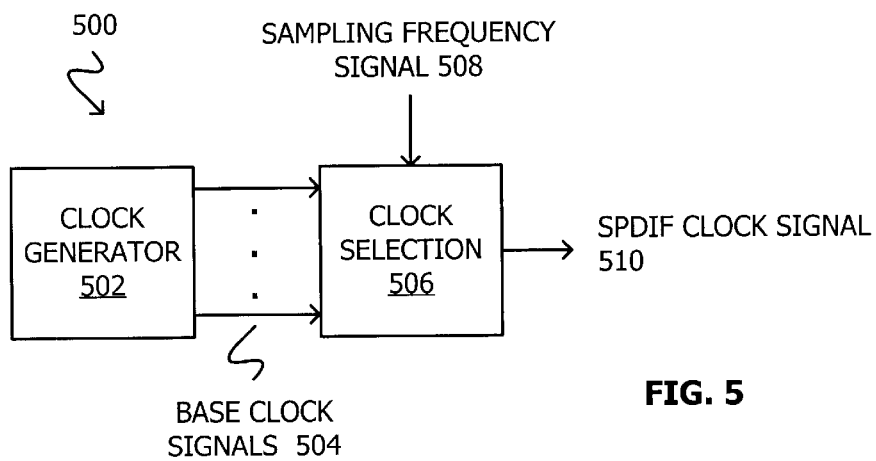
FIG. 5 is a block diagram for a clock circuit that provides one clock frequency from a plurality of possible clock frequencies in accordance with one embodiment of the invention.

Referring to FIG. 5, a block diagram for a clock circuit 500 that may automatically and dynamically provide one clock frequency from a plurality of possible clock frequencies in accordance with one embodiment of the invention is shown. Clock generator 502 may be used to generate one or more base clock signals 504. In one embodiment of the invention, two crystal oscillators and two phase-locked loops (PLLs) may be used to generate base clock signals of 61.44000 MHz and 62.09280 MHz. Clock selection circuit 506 may use a sampling frequency signal 508 (e.g., indication of the data's $F_s$ value from a SPDIF module's controller, see 402 in FIG. 4) to select a base clock signal. The selected base clock signal may be manipulated to generate a desired SPDIF clock signal 510. In one embodiment of the invention, SPDIF clock signal 510 is related to indicated sample frequency $F_s$ in accordance with Table 1.

TABLE 1

Relation Between Sampling and Output Frequencies

| $F_S$ (KHz) | Output Clock Signal (MHz) |
|---|---|
| 32.0 | 4.0960 |
| 44.1 | 5.6448 |
| 48.0 | 6.1440 |

In accordance with the SPDIF/IEC-958 standard, when LPCM data is transmitted the symbol frequency is 64 times the data's sampling frequency, $F_s$ (32 time slots per sample, times 2 channels). Similarly, when AC-3 data is conveyed, the symbol frequency is 64 times the sampling rate ($F_s$) of the AC-3 encoded audio. An additional factor of two (e.g., the clock frequency of 4.0960 MHz is 128 times the sample frequency of 32 KHz) is applied to allow for biphase mark encoding of the data as stipulated by the SPDIF/IEC-958 standard.

Figure 6:
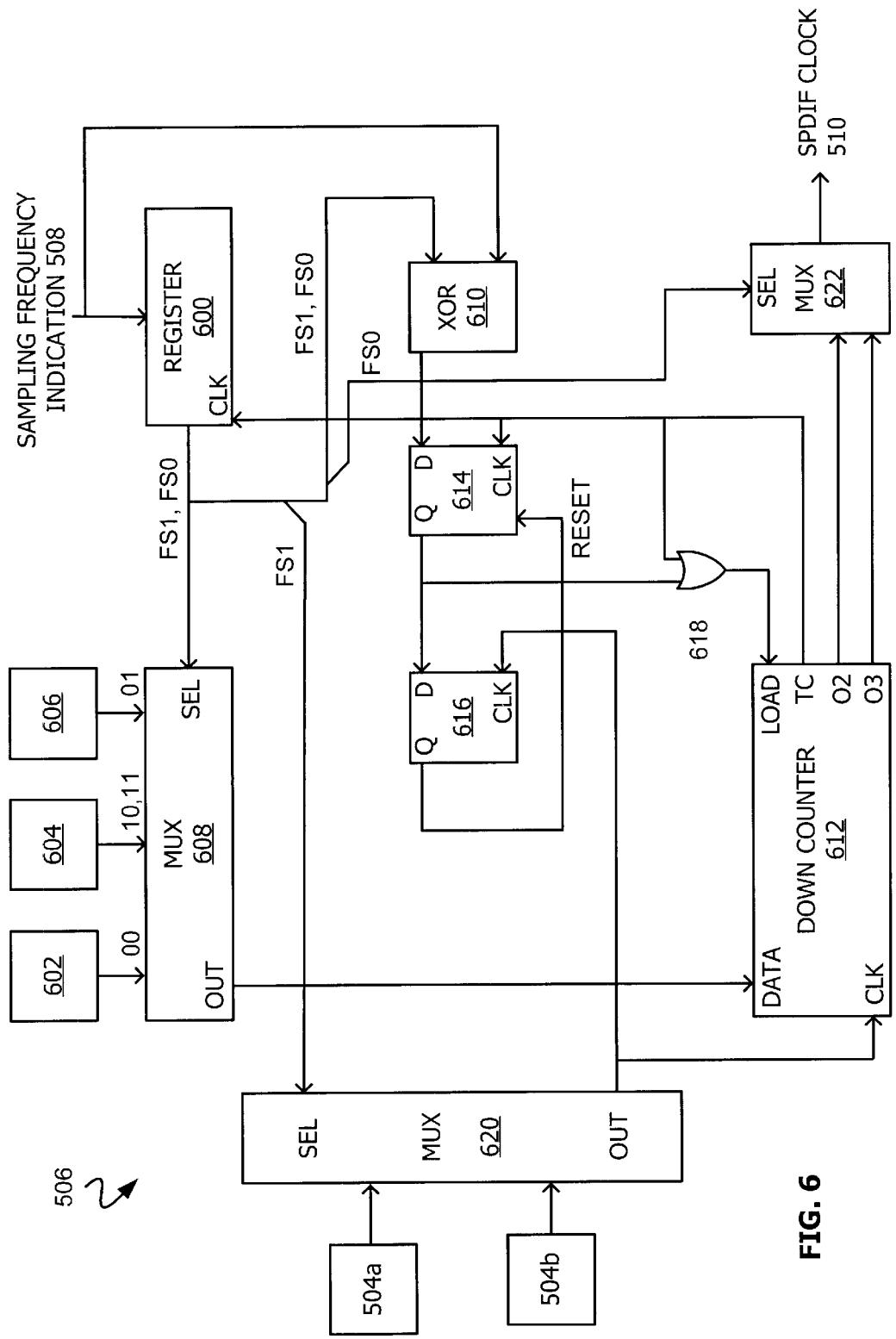
FIG. 6 shows a clock selection circuit in accordance with one embodiment of the invention.

In one embodiment of the invention, shown in FIG. 6, clock selection circuit 506 uses two base clock signals 504a (61.44000 MHz) and 504b (62.09280 MHz). Generally, clock selection circuit 506 uses an indication of the data sampling frequency 508 to select a specified value (stored in count down value registers 602, 604, and 606) which is then used to modify one of the base clock signals 504a or 504b to generate SPDIF clock signal 510.

In more detail, indication of the sampling frequency 508 for a block's audio data may be loaded into register 600. To avoid audible glitches in SPDIF output, it is beneficial for $F_s$, indication 508 to be loaded into register 600 at the conclusion of a block. That is, not during the processing of a previous block of data. In the current embodiment of the SPDIF interface, indication of $F_s$ is provided by 4 bits of the channel status information. Because only 3 sampling frequencies are currently specified (32.0 KHz, 44.1 KHz, and 48.0 kHz), $F_s$ indication 508 may be provided by 2 bits. Thus, $F_s$ indication values may be denoted by a two bit symbol such as 01, where the left most symbol represents the most significant bit ($FS_1$) and the right most symbol represents the least significant bit ($FS_1$).

In the embodiment shown in FIG. 6, output signals from register 600 ($FS_1$ and $FS_0$) may be used to select one of three possible count down values supplied to MUX 608: count down value 602 is 0x09h (decimal 9); count down value 604 is 0x0Ah (decimal 10); and count down value 606 is 0x0Eh (decimal 14). As indicated, a $F_s$ indication value of 00 selects count down value 602, a $F_s$ indication value of 01 selects count down value 606, and $F_s$ indication values of 10 and 11 selects count down value 604.

Exclusive-or (XOR) circuit 610 determines if the current $F_s$ indication value (508) and the previous $F_s$ indication value (output signals from register 600, $FS_1$ and $FS_0$) are the same. If the two sampling frequency indications are not the same, an output signal from XOR circuit 610 causes down counter 612, via flip-flop 614 and 616, and OR-circuit 618, to be loaded with output signals from MUX 608 (i.e., a selected count down value). Count down counter 612 may also be loaded, via OR-circuit 618, when signal TC is asserted. Signal TC is asserted by down counter 612 when it counts down to zero; when all of its output signals are zero. The count down value loaded into down counter 612 (i.e., 602, 604, or 606) defines the pulse intervals of down counter 612 output (03 and 02) and therefore SPDIF clock signal 510's frequency and duty cycle ratio. Typically SPDIF clock signal 510 is supplied as an input clock to a SPDIF module, such as module 400 in FIG. 4.

$FS_1$ output signal from register 600 selects, via MUX 620, which base clock input signal (504a if $FS_1$ is 0, or 504b if $FS_1$ is 1) drives down counter 612 and flip-flop 616. $FS_0$ output signal from register 600 selects, via MUX 622, which down counter output signal (O2 if $FS_0$ is 0, or O3 if $FS_0$ is 1) to provide as SPDIF clock signal 510. Output signal O3 represents down counter 612's most significant output bit. Output signal O2 represents down counter 612's next most significant output bit.

In summary, the relationship between $F_s$ indication input (e.g., $FS_1$ and $FS_0$ signals), base clock signal frequency (e.g., 504a and 504b) and SPDIF clock signal 510 provided by illustrative clock circuit 506 is shown in Table 2.

TABLE 2

Clock Circuit Input-Output Relationships

| $FS_1$ | $FS_0$ | $F_S$ (KHz) | Base Clock (MHz) | Count Down Value | SPDIF Clock (MHz) |
|---|---|---|---|---|---|
| 0 | 1 | 32.0 | 61.4400 | 14 | 4.0960 |
| 1 | 0 | 44.1 | 62.0928 | 10 | 5.6448 |
| 0 | 0 | 48.0 | 61.4400 | 9 | 6.1440 |
| 1 | 1 | | | RESERVED | |

Figure 7:
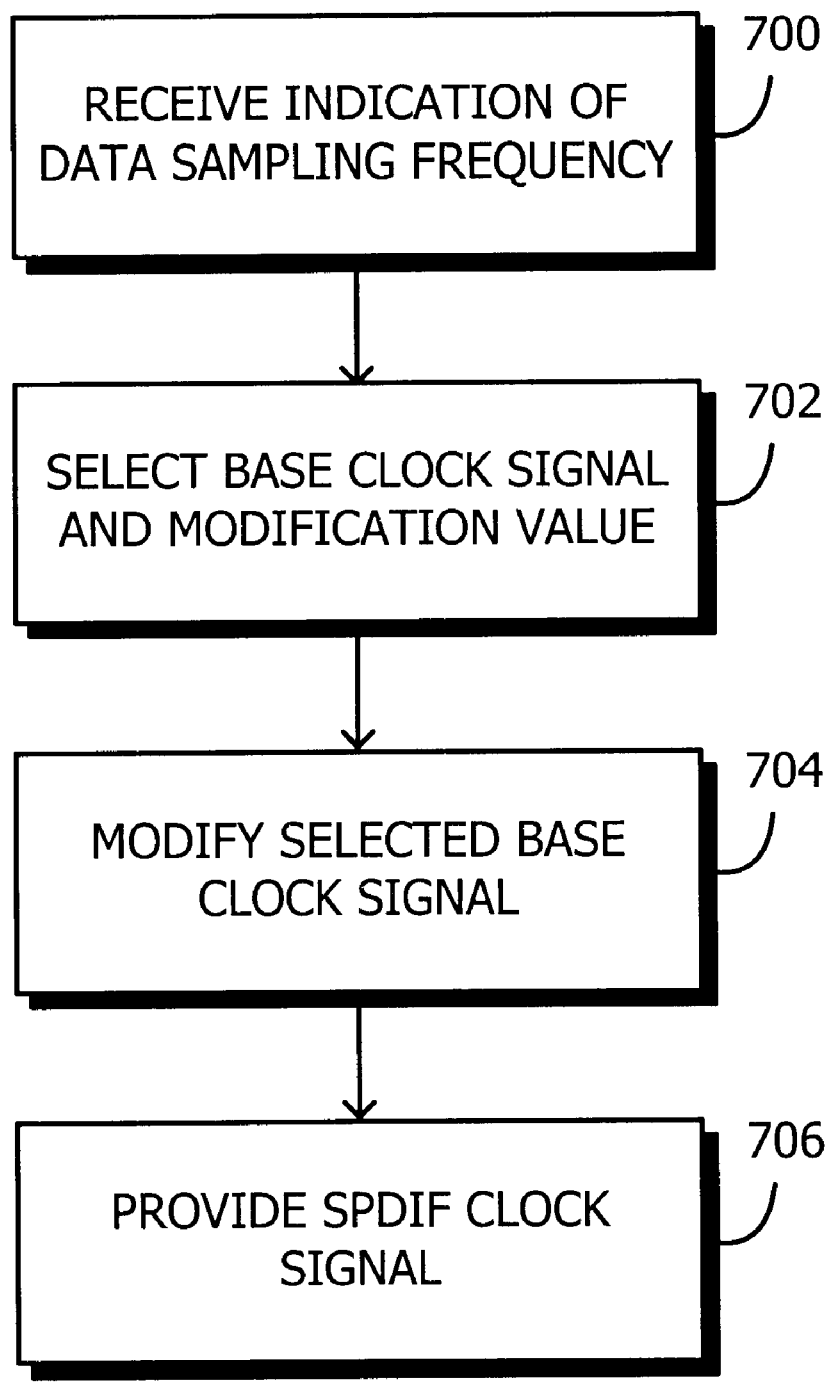
FIG. 7 shows, in flow chart form, the operational behavior of the clock selection circuit of FIG. 6.

Operationally, clock selection circuit 506 may behave as shown in FIG. 7. Initially, clock selection circuit 506 receives indication of the audio data's sampling frequency, e.g., 506 (block 700). Based on this received indication, a base clock signal (e.g., 504a or 504b) and a base clock signal modification value, e.g., count down values 602, 604, and 606, are selected (block 702). Next, the selected base clock signal modification value is used to modify the selected base clock signal to generate a SPDIF clock signal 510 (block 704), which may then be provided to a SPDIF module, e.g., SPDIF module 400 (block 706).

Referring to FIG. 8, an illustrative computer system 800 having SPDIF module 400 and clock circuit 500 is shown. Computer system 800 may include host processor 802 coupled to primary bus 804 through bridge circuit 806. Bridge circuit 806 may provide an interface to couple system random access memory (RAM) 808 and accelerated graphics port (AGP) 810 devices such as, for example, video controller 812 and associated display unit 814. Illustrative host processors (e.g., 802) include the PENTIUM® family of processors and the 80×86 families of processors from Intel Corporation. One illustrative bridge circuit 806 is the 82443LX PCI-to-AGP controller manufactured by Intel Corporation. An illustrative primary bus may conform to the peripheral component interface (PCI) standard.

Bridge circuit 816 may couple system bus 804 to secondary bus 818, while also providing integrated device electronics (IDE) 820 and universal serial bus (USB) 822 interfaces. Common IDE devices include magnetic and optical disk drives. One illustrative bridge circuit 816 is the 82371AB PCI-to-ISA/IDE controller made by Intel Corporation. Illustrative secondary buses include buses that conform to the PCI, industry standard interface (ISA), and extended industry standard interface (ISA) standards.

Input-output (I/O) circuit 824, keyboard controller (KYBD) 826, and system read only memory (ROM) 828 may also be coupled to secondary bus 818. Input-output circuit 824 may provide an interface for parallel 830 and serial 832 ports, floppy-disks 834, and infrared ports 836.

As shown, SPDIF module 400 is coupled to primary bus 804, and clock circuit 500 is coupled to SPDIF module 400. In another embodiment, SPDIF module 400 and/or clock circuit 500 may be incorporated into bridge 806. In yet another embodiment, SPDIF module 400 and/or clock circuit 500 may be coupled to primary bus 804 through bridge circuit 816. SPDIF module 400 and/or clock circuit 500 may also be incorporated within bridge circuit 816.

Various changes in the materials, components, circuit elements and operational method are possible without departing from the scope of the following claims. For instance, the illustrative clock selection circuit of FIG. 6 may be embodied in discrete logic (as shown), or it may be embodied within one or more specially designed semiconductor devices. In another embodiment, the inventive clock selection circuit may be implemented as a special purpose state machine. In yet another embodiment, clock selection circuit function (e.g., FIG. 7) may be performed by a programmable control device executing instructions organized into a program module. A programmable control device may be a computer processor or a custom designed state machine. Custom designed state machines may be embodied in a hardware device such as a printed circuit board comprising discrete logic, integrated circuits, or specially designed application specific integrated circuits (ASIC). Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the current version of the SPDIF/IEC-958 standard defines only three sampling frequencies, circuits and methods in accordance with the invention are not limited to providing an output signal having one of three possible frequencies. For example, inventive clock circuit 500 may provide an output signal having one of more than three possible frequencies. Further, a clock circuit in accordance with the invention may employ fewer or more than two base clock signals. In addition, a clock circuit or clock selection circuit in accordance with the invention may include additional input and output signals. For example, a reset signal may be provided to clock circuit 500 to place the circuit in a known state. Also, clock circuit 500 may provide status or state identification signals to, for example, a SPDIF module.

What is claimed is:

1. A clock circuit comprising:
   a register to receive indication of a data sampling frequency;
   a selection circuit operatively coupled to the register, the indicated data sampling frequency adapted to select one of a plurality of signals provided to the selection circuit; and
   a modification circuit to modify the selected signal based on, at least in part, the indicated sampling frequency.

2. The clock circuit of claim 1, wherein the modification circuit comprises:
   a count down value register operatively coupled to the register; and
   a counter operatively coupled to the count down value register and the selection circuit.

3. The clock circuit of claim 1, further comprising a circuit to determine if a current indicated data sampling frequency is substantially the same as a prior indicated data sampling frequency.

4. The clock circuit of claim 1, wherein the indicated data sampling frequency is capable of being provided by an audio processing circuit.

5. The clock circuit of claim 4, wherein the audio processing circuit comprises a circuit capable of operating in accordance with the International Electrotechnical Commission 958 standard.

6. The clock circuit of claim 1, wherein the counter comprises a count down counter.

7. The clock circuit of claim 6, wherein the down counter is coupled to the count down value register so as to be periodically loaded with a value from the count down value register.

8. The clock circuit of claim 1, wherein the indicated data sampling frequency comprises one of 32 kilohertz, 44.1 kilohertz, and 48 kilohertz sampling frequency.

9. The clock circuit of claim 8, wherein the modified signal comprises a clock signal and the second circuit comprises an audio processing circuit.

10. The clock circuit of claim 9, wherein the audio processing circuit comprises a circuit in accordance with the International Electrotechnical Commission 958 standard.

11. The clock circuit of claim 1, wherein the plurality of signals provided to the selection circuit comprise base clock signals.

12. The clock circuit of claim 11, wherein the base clock signals comprise a clock signal having a frequency of 61.44000 megahertz.

13. The clock circuit of claim 12, further comprising a base clock signal having a frequency of 62.09280 megahertz.

14. A computer system, comprising:
    a bus;
    a host processor operatively coupled to the bus;
    an audio processing circuit operatively coupled to the bus; and
    a clock circuit operatively coupled to the audio processing circuit, the clock circuit having
        a register to receive indication of a data sampling frequency;
        a selection circuit operatively coupled to the register, the indicated data sampling frequency adapted to select one of a plurality of signals provided to the selection circuit; and
        a modification circuit to modify the selected signal based on, at least in part, the indicated sampling frequency.

15. The computer system of claim 14, wherein the audio processing circuit comprises a circuit capable of operating in accordance with the International Electrotechnical Commission 958 standard.

16. The computer system of claim 14, wherein the modification circuit comprises:
    a count down value register operatively coupled to the register; and
    a counter operatively coupled to the count down value register and the selection circuit.

17. The computer system of claim 16, wherein the counter comprises a count down counter.

18. The computer system of claim 17, wherein the down counter is coupled to the count down value register so as to be periodically loaded with a value from the count down value register.

19. The computer system of claim 14, further comprising a circuit to determine if a current indicated data sampling frequency is substantially the same as a prior indicated data sampling frequency.

20. A method to provide a clock signal to an audio processing circuit, comprising:
    receiving a signal indicating a data sampling frequency;
    selecting one clock signal from a plurality of input clock signals based on the received data sampling frequency indication; and
    modifying the selected clock signal, based, at least in part, on the indicated sampling frequency, to generate an output clock signal.

21. The method of claim 20, wherein the act of receiving comprises receiving a signal from the audio processing circuit operating in accordance with the International Electrotechnical Commission 958 standard.

22. The method of claim 20, wherein the act of modifying comprises generating the output clock signal having a lower frequency than the selected clock signal.

23. The method of claim 20, wherein the ad of modifying comprises:
    selecting a count down value based at least in part on the received signal indicating the data sampling frequency; and
    loading a counter with the selected count down value.

24. The method of claim 23, wherein the act of loading the counter comprises periodically loading the counter.

25. The method of claim 24, wherein the act of periodically loading the counter is performed when a new indicated data sampling frequency indication is received.

26. The method of claim 24, wherein the act of periodically loading the counter is performed when the counter counts down to a predetermined value.

27. The method of claim 26, wherein the predetermined value is zero.

* * * * *